(12) United States Patent
Nikayin et al.

(10) Patent No.: US 10,135,232 B2
(45) Date of Patent: Nov. 20, 2018

(54) JUNCTION BOX BAR BRACKET

(71) Applicants: Saeed Nikayin, Los Angeles, CA (US); Kai Zhang, Los Angeles, CA (US); Gilbert Loera, Los Angeles, CA (US); Andrew Choi, Los Angeles, CA (US)

(72) Inventors: Saeed Nikayin, Los Angeles, CA (US); Kai Zhang, Los Angeles, CA (US); Gilbert Loera, Los Angeles, CA (US); Andrew Choi, Los Angeles, CA (US)

( * ) Notice: Subject to any disclaimer, the term of this patent is extended or adjusted under 35 U.S.C. 154(b) by 0 days.

(21) Appl. No.: 15/373,815

(22) Filed: Dec. 9, 2016

(65) Prior Publication Data
US 2017/0093140 A1   Mar. 30, 2017

Related U.S. Application Data

(63) Continuation-in-part of application No. 14/712,834, filed on May 14, 2015.

(51) Int. Cl.
*H02G 3/12*   (2006.01)
*F16B 2/20*   (2006.01)

(52) U.S. Cl.
CPC ............... *H02G 3/125* (2013.01); *F16B 2/20* (2013.01); *H02G 3/12* (2013.01)

(58) Field of Classification Search
CPC ...... F16B 2/20; F16B 2/22; F16B 2/24; F16B 2/241; F16B 2/243; F16B 2/245; F16B 2/246; F16B 12/32; F16B 12/38; E04B 9/006; E04B 2001/405; E04G 25/00; H02G 3/32; H02G 3/12; H02G 3/123; H02G 3/125; H02G 3/126; H02G 3/083; H02G 1/00; Y10S 248/906; H01R 13/518; F21V 21/02; B60T 17/046; F16L 3/24

USPC ........ 248/200.1, 200, 201, 205.1, 300, 68.1, 248/56, 57, 906, 342, 343, 316.8, 298.1, 248/218.4

See application file for complete search history.

(56) References Cited

U.S. PATENT DOCUMENTS

| | | | |
|---|---|---|---|
| 1,288,024 A | 12/1918 | Kendig | |
| 1,930,928 A | 10/1933 | Dunlap, Sr. | |
| 1,982,957 A | 12/1934 | Knell | |
| 3,182,805 A | 5/1965 | Foster, Jr. et al. | |
| 3,684,230 A * | 8/1972 | Swanquist | H02G 3/125 220/3.9 |
| 4,757,967 A | 7/1988 | Delmore | |
| 4,967,990 A | 11/1990 | Rinderer | |
| 5,114,105 A | 5/1992 | Young | |
| 5,209,444 A | 5/1993 | Rinderer | |
| 5,333,137 A | 7/1994 | Oliva | |

(Continued)

*Primary Examiner* — Nkeisha Smith
(74) *Attorney, Agent, or Firm* — Kirk A. Buhler; Buhler & Associates

(57) ABSTRACT

Improvements in a bracket is disclosed for mounting an electrical box onto a mounting bar. An electrical box can be preinstalled onto the bracket and clamped onto the mounting bar using wings. Bendable tabs can be articulated to secure the bracket and onto a rail. Fasteners are used to secure an electrical junction box onto the bracket and an additional fastener secures the sub assembly to the rail. The tabs can be unbent for removal. An installer can secure the bracket and electrical box using a screw and adjust the position of the bracket on the mounting bar. The bracket provides a low profile assemble that allows the bracket to be installed between the inner surfaces of stud walls.

19 Claims, 5 Drawing Sheets

(56) References Cited

U.S. PATENT DOCUMENTS

| | | |
|---|---|---|
| 5,516,068 A | 5/1996 | Rice |
| 5,927,667 A | 7/1999 | Swanson |
| 6,209,836 B1 | 4/2001 | Swanson |
| 6,389,658 B1 * | 5/2002 | Pfaller .................. F16B 2/245 220/3.9 |
| 6,484,980 B2 | 11/2002 | Medlin, Sr. et al. |
| 6,485,979 B1 | 11/2002 | Medlin, Jr. |
| 6,761,341 B2 | 7/2004 | Pfaller |
| 6,768,071 B1 | 7/2004 | Gretz |
| 7,073,757 B2 | 7/2006 | Johnson et al. |
| 7,360,745 B2 | 4/2008 | Nikayin et al. |
| 7,472,875 B2 * | 1/2009 | Rinderer ................ H02G 3/125 220/3.3 |
| 7,923,635 B2 * | 4/2011 | Korcz .................... H02G 3/126 174/50 |
| 8,403,277 B2 * | 3/2013 | Nuernberger .......... H02G 3/125 174/58 |
| 8,702,047 B2 * | 4/2014 | Nuernberger .......... H02G 3/125 174/58 |
| 8,770,526 B2 * | 7/2014 | Siddiqui ................ H02G 3/105 174/58 |
| 8,889,984 B2 * | 11/2014 | Korcz .................. F16M 13/027 174/40 R |
| 9,261,120 B2 | 2/2016 | Colangelo et al. |
| 9,568,123 B2 * | 2/2017 | Zhang .................... H02G 3/081 |
| 2006/0237601 A1 | 10/2006 | Rinderer |
| 2009/0166486 A1 | 7/2009 | Sugiyama et al. |
| 2012/0298816 A1 | 11/2012 | Siddiqui et al. |
| 2013/0140415 A1 | 6/2013 | Nuernberger et al. |
| 2016/0334056 A1 * | 11/2016 | Nikayin ............... F16M 13/022 |

* cited by examiner

JUNCTION BOX BAR BRACKET

CROSS REFERENCE TO RELATED APPLICATION

This application is a continuation-in-part of applicant's co-pending application Ser. No. 14/712,834 filed May 14, 2015 the entire contents of which is hereby expressly incorporated by reference herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

This invention relates to improvements in an electrical box mounting bracket. More particularly, the present an electrical box mounting bracket connects between an electrical junction box and a rail and allows the electrical junction box to be installed and positioned or re-positioned along the rail without any tools.

Description of Related Art Including Information Disclosed Under 37 Cfr 1.97 and 1.98

A number of patents and or publications have been made to address these issues. Exemplary examples of patents and or publication that try to address this/these problem(s) are identified and discussed below.

U.S. Pat. No. 3,182,805 issued May 11, 1965 to A. A. Foster Jr. et al., discloses a Telephone Office Mounting Plate. The mounting plate clamps to a pair of rails to allow the telephone plate to slide along the rails to mount the telephone box at any location along the rails. While this patent allows the telephone box to be mounted to the railing, the telephone box is not a standard junction box that can be moved along the railing system.

U.S. Pat. Nos. 4,967,990 and 5,209,444 issued on Nov. 6, 1990 and May 11, 1993, respectively, both issued to Eric R. Rider disclose a Support for an Electrical box. Both of these patents use a bar that mounts between two studs. The bar has a plurality of holes where a junction box is screwed onto the bar using holes on the bar. While this patent allows for a junction box to be mounted onto various positions on the bar, the positions are finite and further the bar is a fixed length. This patent does not allow for different lengths between studs or for infinite positioning along the bar.

U.S. Pat. No. 5,330,137 issued on Jul. 19, 1994 to John H. Olvia discloses an Apparatus and Methods for Mounting an Electrical Box between Studs in a Wall. This patent uses an open frame where a junction box is mounted with a faceplate through the open frame to an electrical box. The open frame has a fixed dimension between the studs and the connection between the faceplate and the junction box must be made through the frame. Both the faceplate and the junction box must be uniquely fabricated to operate with the frame.

What is needed is an adjustable stud support rail with a bracket that is slidable secured to the bracket. The bracket further should allow for a junction box to the mounted to the bracket. The electrical box mounting bracket disclosed in this document provides the solution.

BRIEF SUMMARY OF THE INVENTION

It is an object of the junction box bar bracket to clamp onto a rail or mounting bar and to be able to be adjustably positioned. A mounting bar typically has a channel shaped cross section with a plurality of fastening holes. Flanges on the ends of the mounting bar allow for installation onto wood or metal studs. The electrical box mounting bracket is comprised of at least two wings or tabs that are bendable to secure the bracket and junction box on a mounting bar. To move the bracket, securing screws are removed and the bracket can be slid along the rail. The tabs or ears can be re-bent to allow the bracket to be removed from the rail. An installer can thus also adjust the relative position of the bracket with the mounting bar.

It is another object of the junction box bar bracket to preinstall an electrical box before installing onto a mounting bar. An electrical junction box is typically a metal enclosure where wiring is brought into the box with conduit. Electrical wires are typically connected to an outlet, switch, or device. In order to place the outlet, switch, or device in its desired location behind drywall, a mounting bar is used to secure the electrical box in place. The electrical box mounting bracket features a fastening hole and tail for securing the electrical box onto said bracket. The assembly of the electrical box and bracket can then be mounted onto the mounting bar in the desired position before permanently securing with screws.

It is another object of the junction box bar bracket to be economical. A bracket that uses open and closed positions can be seen in U.S. Pat. No. 8,702,047. However, due to the orientation of the front and rear jaw, a larger piece of sheet metal is required. The electrical box mounting bracket uses wings that can be moved to an open or closed position oriented in the direction of the mounting bar. As a result, the electrical box mounting bracket is reduced in size while maintaining a secure and dependable installation.

This reduces the cost and greatly increases the ease of storage.

It is still another object of the junction box bar bracket for the bracket to be low profile. The low profile refers to the distance from the back of the mounting bar to a wall on the other side of the junction box. The stack dimension must fit within a standard wall thickness of about 3½ inches and this junction box bar bracket achieves the low, thin profile.

Various objects, features, aspects, and advantages of the present invention will become more apparent from the following detailed description of preferred embodiments of the invention, along with the accompanying drawings in which like numerals represent like components.

BRIEF DESCRIPTION OF THE SEVERAL VIEWS OF THE DRAWING(S)

DETAILED DESCRIPTION OF THE INVENTION

Figure 1:
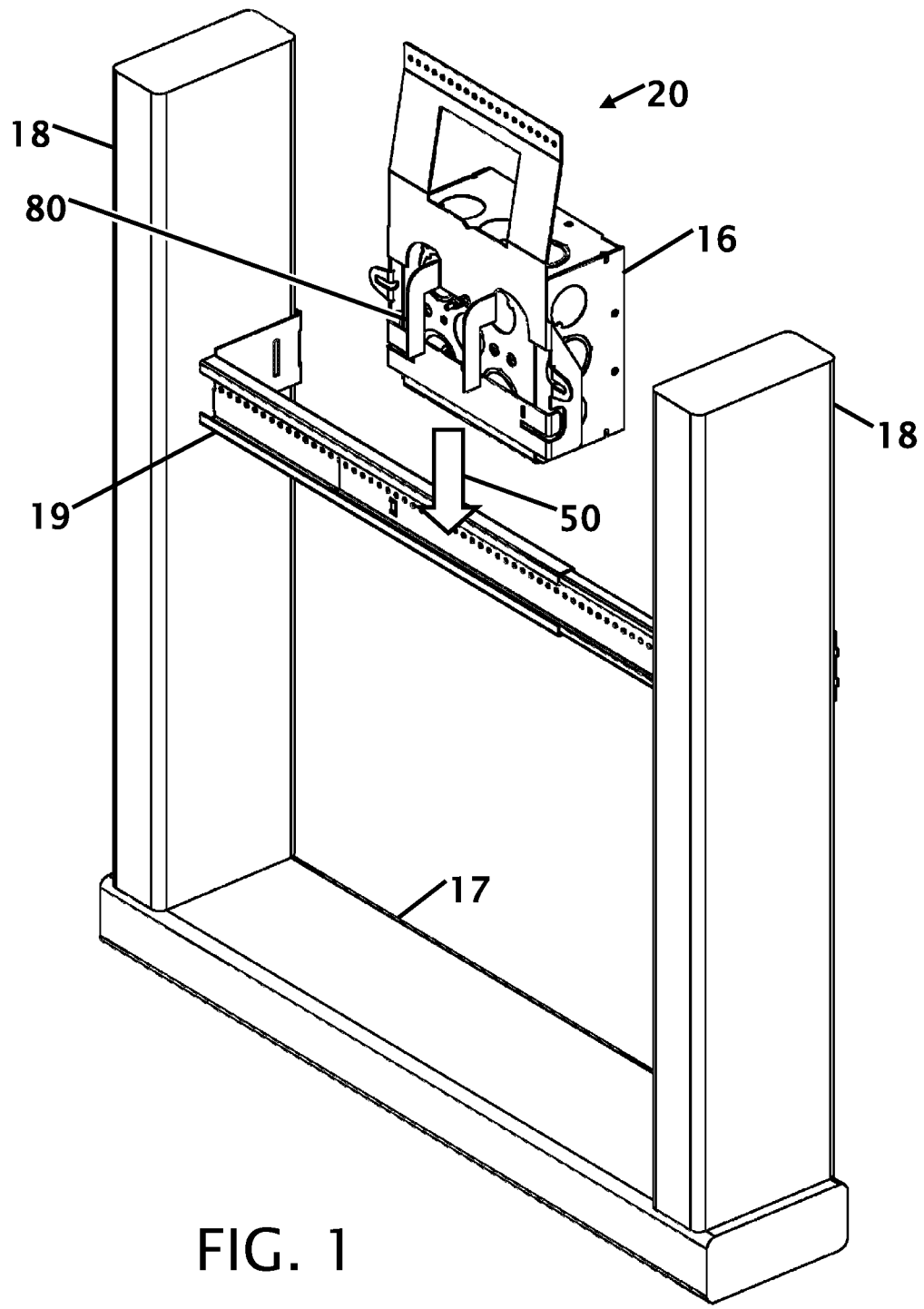
FIG. 1 shows a perspective rear view of the junction box bar bracket, junction box, bar bracket ready to install.

FIG. 1 shows a perspective rear view of the junction box bar bracket 20, junction box 16 ready to install on a bar bracket 19 that is installed on studs 18. This is a typical installation where the junction box bar bracket 20 can be installed to accept an outlet or a switch box. The junction box bar bracket 20 essentially wraps around the junction box 16. This embodiment is configured to accept two outlets or switches. It is further contemplated that the junction box bar bracket 20 can be configured to accept a single outlet or switch, but can also be configured to accept more than two outlets, switches or combination thereof. While outlets or switches are described, the electrical box can also be used for phone, internet or other uses. The studs 18 and footer 17 are typical dimensions such as 2×4, 2×6 or other wood or metal studs. The overall stack height of the junction box bar bracket 20 and junction box must fit within the internal wall cavity of typically 3½ inches.

Figure 2:
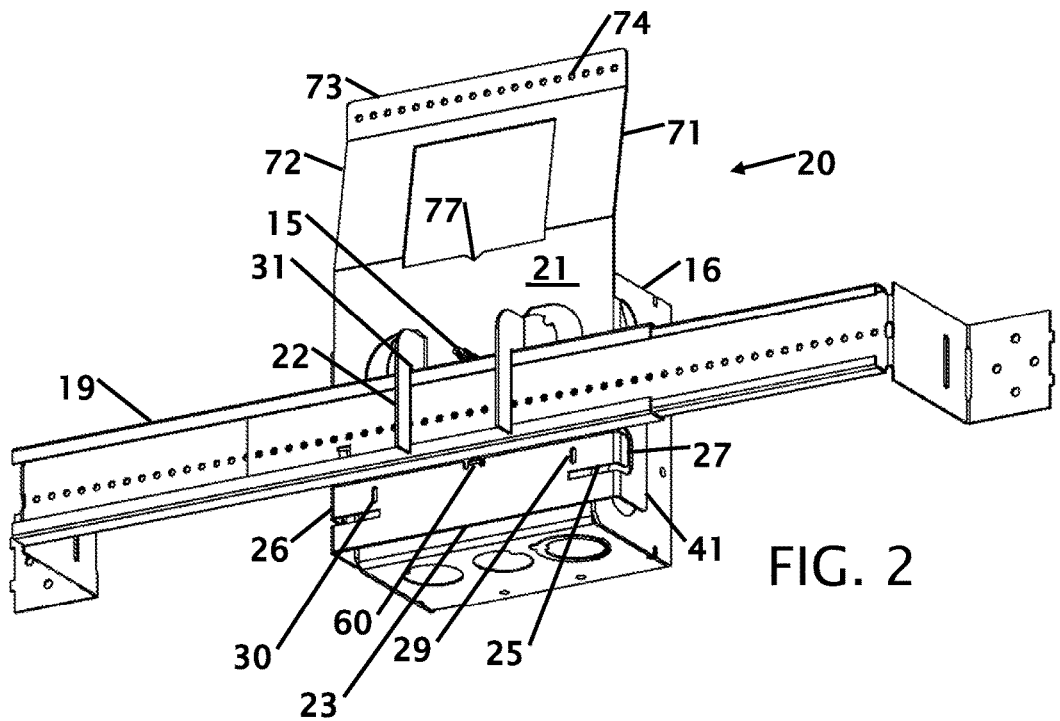
FIG. 2 shows the junction box bar bracket set onto a bar bracket.
Figure 3:
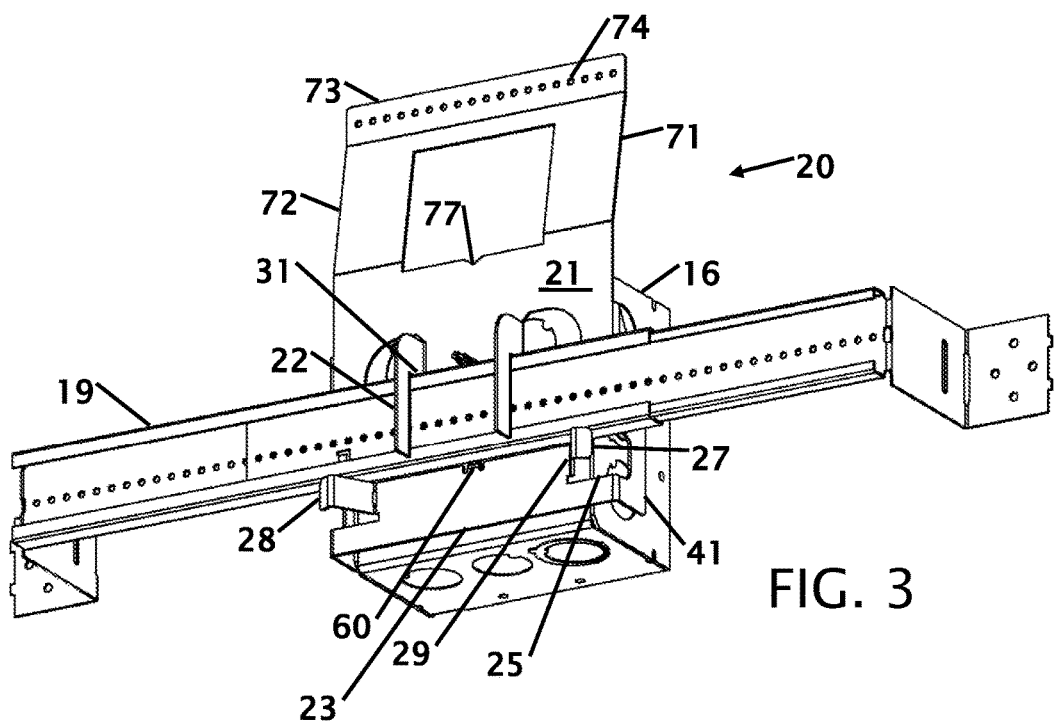
FIG. 3 shows the junction box bar bracket on a bar bracket with the locking ears bent.

FIG. 2 shows the junction box bar bracket 20 set onto a bar bracket 19 and FIG. 3 shows the junction box bar bracket 20 on a bar bracket 19 with the locking ears 25 and 26 bent. The junction box bar bracket 20 is placed onto the bar bracket 19 where the junction box bar bracket 20 is initially held in place with the bar bracket 19 captured between a shelf 31 that is formed by the rear rib 22 from a back plate 21. The junction box 16 is captured on the junction box bar bracket 20 by side supports 40 and 41 that is bent around ears 25 and 26, and is hung on a hook 60. The side supports, 40 and 41 bend from the top of the back plate 21 and the bottom 23 of the back plate. A fastener 15 is further used to secure the junction box 16 onto the junction box bar bracket 20. Gravity will generally hold the junction box bar bracket 20 with the secured junction box 16 on the bar bracket 19. The back of the junction box bar bracket 20 has a plurality of locking ears 26 and 27 located on a lower portion of the back plate 21 of the junction box bar bracket 20.

One or both of these locking ears 25 and 26 can be independently or collectively bent to secure the sub assembly on the bar bracket 19. When the locking ears 25 and 26 are bent (as shown in FIG. 3), the junction box bar bracket 20 with (or without) a secured junction box 16 is not freely removable from the bar bracket 19. The ends of the locking ears 25 and 26 have ear tips 27 and 28 that provide additional structural support to the bottom of the bar bracket 19, and further reduces a sharp edge to the end(s) of the locking ears 25, 26. The ears 25 and 26 a separated from the back plate 21 with voids 29 and 30. These voids 29 and 30 provide for a reduction in the material for bending the ears 25 and 26, and also can be used with a tool, such as a screw driver, that can be inserted into the voids for easier bending of the ears 25 and 26. While a screwdriver or other tool can be used the ears 25 and 26 are bendable by hand.

The sub assembly can then be slid and positioned on the bar bracket to the desired location. Additional fasteners can be installed through the junction box bar bracket 20 into the holes, or slots 45 and 46 (not shown in this figure) in the bar bracket 19 to prevent movement of the junction box bar bracket 20 and junction box 16 on the bar bracket 19. The upper portion of the junction box bar bracket 20 includes additional support features for securing the junction box bar bracket 20.

The upper portion of the junction box bar bracket 20 has side supports 71 and 72. The side supports extend from the back plate 21 to a top support 73 that has a plurality of holes 74 for securing conduit tubes to the top support 73 with fasteners to reduce movement of the conduit. The middle top of the back plate 21 has a notch 77 that identifies the center of the junction box bar bracket 20.

Figure 4:
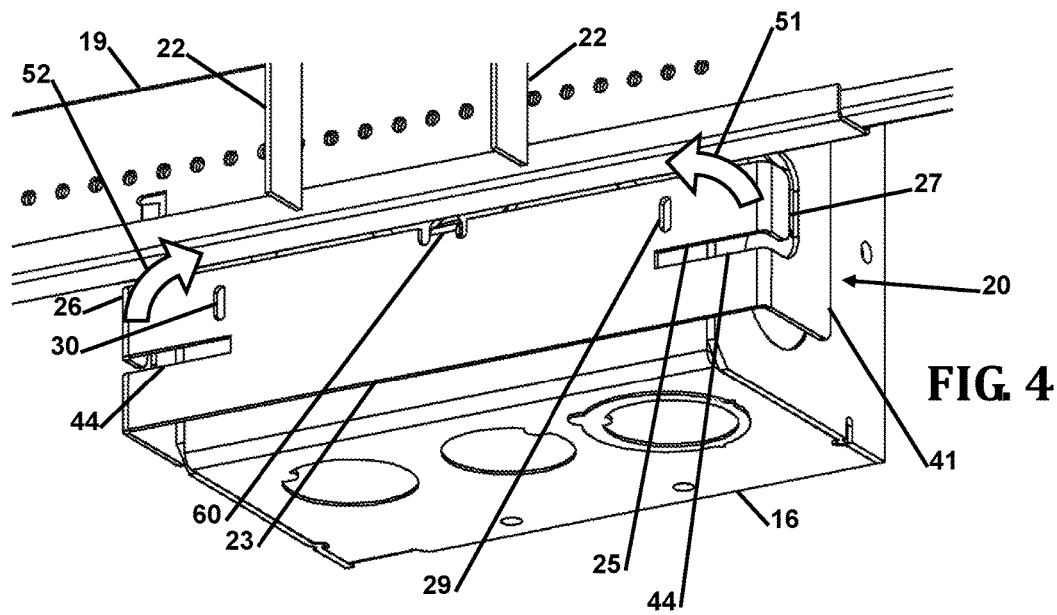
FIG. 4 shows a detail view of the junction box bar bracket set onto a bar bracket.
Figure 5:
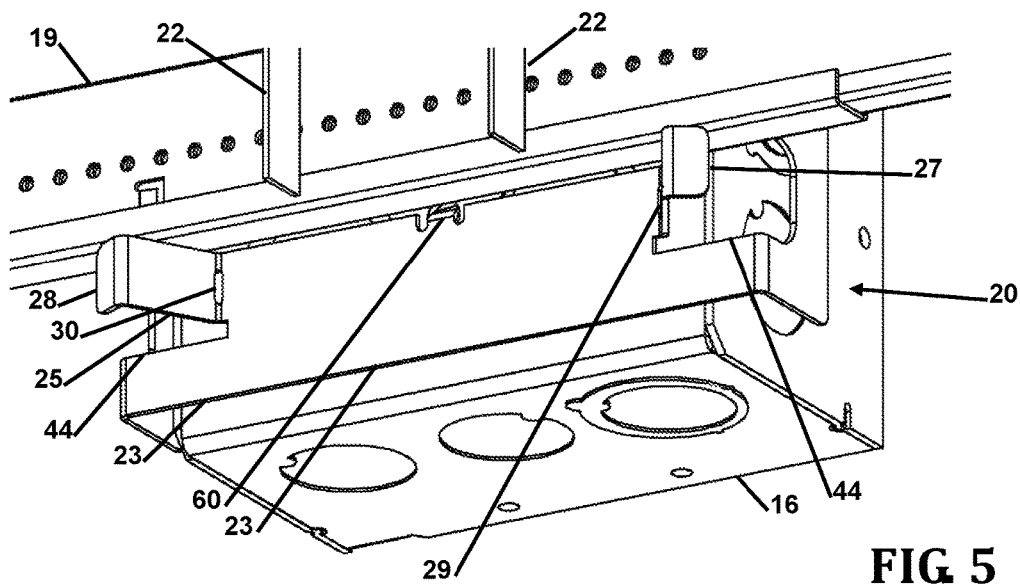
FIG. 5 shows a detail view of the junction box bar bracket on a bar bracket with the locking ears bent.

FIG. 4 shows a detail view of the junction box bar bracket 20 set onto a bar bracket 19 and FIG. 5 shows a detail view of the junction box bar bracket 20 on a bar bracket 19 with the locking ears 25 and 26 bent 51, 52. As previously described the junction box bar bracket 20 is placed onto the bar bracket 19 where the junction box bar bracket 20 is initially held on the bar bracket 19 where it is captured between a shelf 31 that is formed by the rear rib 22 from a back plate 21. The junction box 16 is captured on the junction box bar bracket 20 by side supports 40 and 41 that is bent around ears 25 and 26, and is hung on a hook or rear tab 60. The side supports 40 and 41 bend from the top of the back plate 21 and the bottom 23 of the back plate. A fastener 15 is further used to secure the junction box 16 onto the junction box bar bracket 20. The back 21 of the junction box bar bracket 20 has a plurality of locking ears 25 and 26 located on a lower portion of the back plate 21 of the junction box bar bracket 20.

These locking ears 25 and 26 can be independently bent 51, 52 to secure the junction box bar bracket 20 and junction box on the bar bracket 19. When the locking ears 25 and 26 are bent 51, 52, the junction box bar bracket 20 is not freely removable from the bar bracket 19. The ends of the locking ears 25 and 26 have ear tips 27 and 28 that provide additional structural support to the bottom of the bar bracket 19. The ears 25 and 26 a separated from the back plate 21 with voids 29 and 30. These voids 29 and 30 provide for a reduction in the material for bending the ears 25 and 26, and also can be used with a tool, such as a screw driver, that can be inserted into the voids 29 and 30 for easier bending of the ears 25 and 26. Slots 44 provide clearance for the ears 25 and 26 to bend from the back plate 21.

The sub assembly can then be slid and positioned on the bar bracket to the desired location. Additional fasteners can be installed through the junction box bar bracket 20 into the holes, or slots 45 and 46 (not shown in this figure) in the bar bracket 19 to prevent movement of the junction box bar bracket 20 and junction box 16 on the bar bracket 19.

Figure 6:
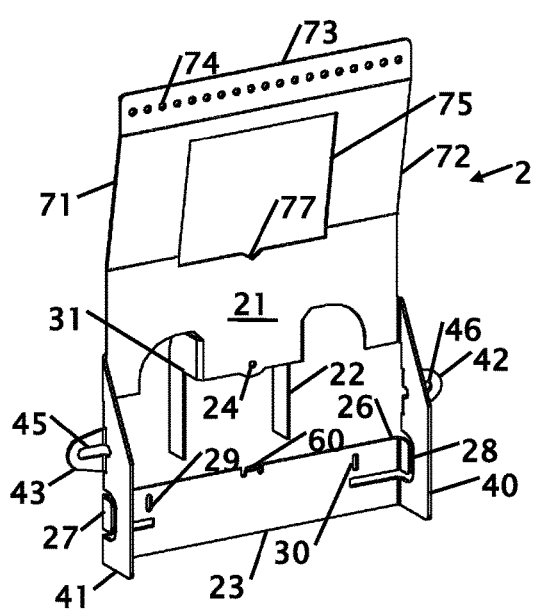
FIG. 6 shows the junction box bar bracket.
Figure 7:
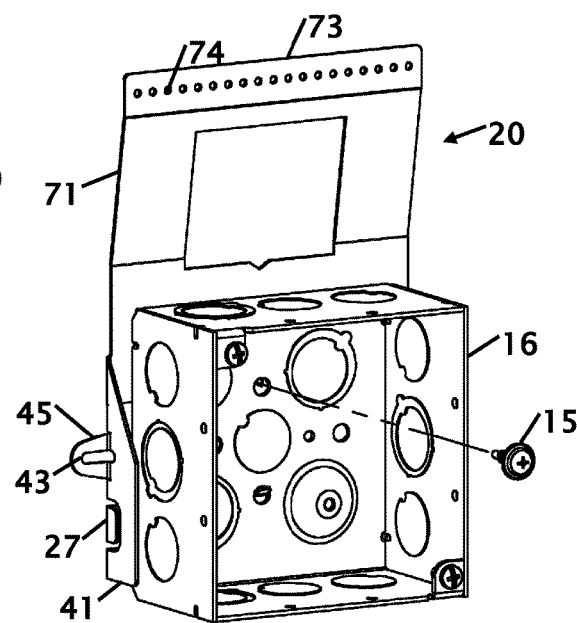
FIG. 7 shows the junction box bar bracket with an electrical junction box.
Figure 8:
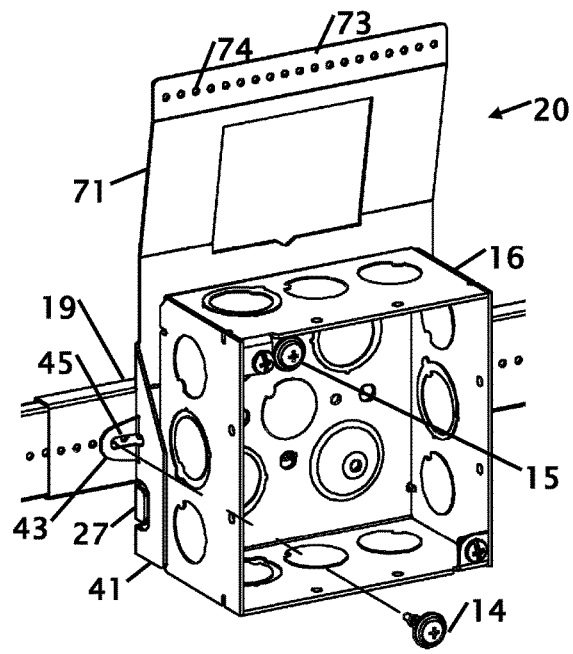
FIG. 8 shows the junction box bar bracket with an electrical junction box secured to a mounting bar.

FIG. 6 shows the junction box bar bracket and FIG. 7 shows the junction box bar bracket with an electrical junction box and FIG. 8 shows the junction box bar bracket with an electrical junction box secured to a mounting bar. These figures show the progression of installation of the junction box bar bracket 20. These figures show the front features with the junction box bar bracket 20. In FIG. 6 the junction box 16 has not been installed. The tab or hook 60 is shows in these figures where the tab or hook 60 extend towards or into a junction box 16, shown in FIG. 8. The locking ears are bent about FIG. 8 to secure the junction box bar bracket 20 onto the bar bracket 19. In FIG. 7 the electrical box 16 is installed on the junction box bar bracket 20 onto tab or hook 60 and is being secured with fastener 15.

In FIG. 8 the combined junction box bar bracket 20 and junction box 16 is being secured onto the bar bracket 19, the ear 27 is bent and then a fastener 14 locks the position of the junction box bar bracket 20 and the junction box 16 onto the bar bracket 19. These figures show the fastening ears 42 and 43 with slots 45 and 46 where a fastener is inserted through one or both slots 45 and / or 46 and then the fastener is engaged into the bar bracket 19, shown in FIG. 8.

Figure 9:
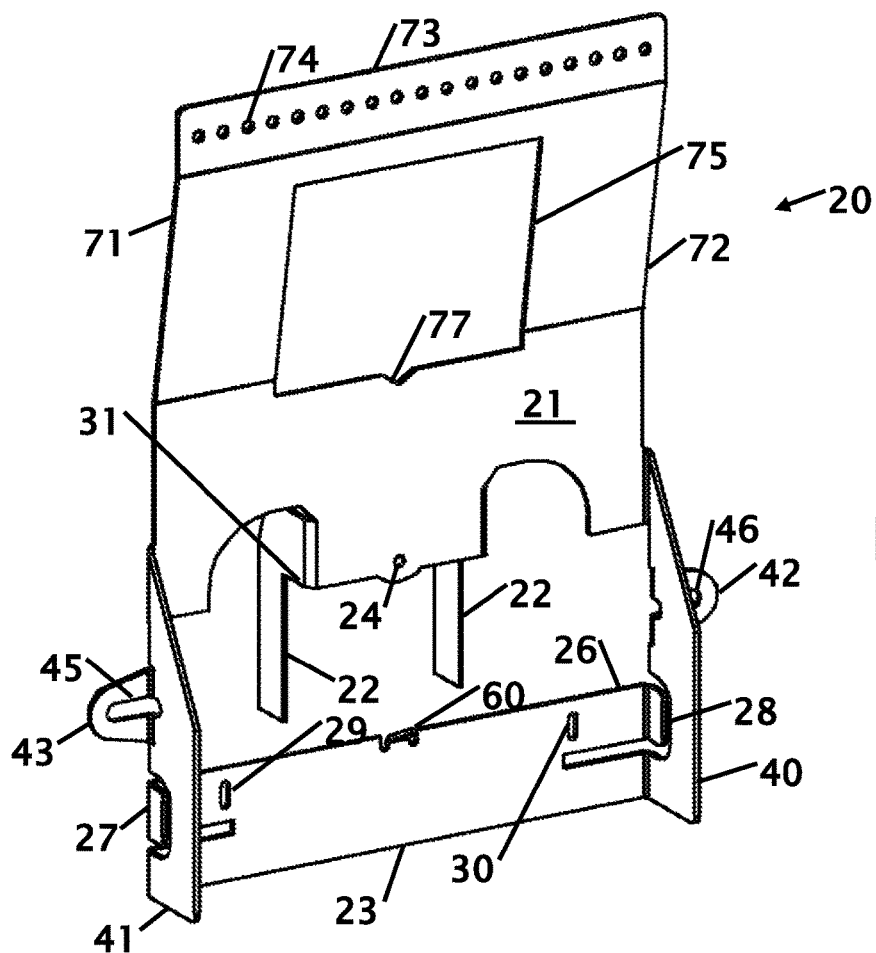
FIG. 9 shows the junction box bar bracket in a first preferred embodiment.

FIG. 9 shows the junction box bar bracket in a first preferred embodiment. This embodiment is the embodiment that is shown and described in the previous figures. While this embodiment is shown, and described, other embodiments are contemplated that provide a similar securing mechanism.

Figure 10:
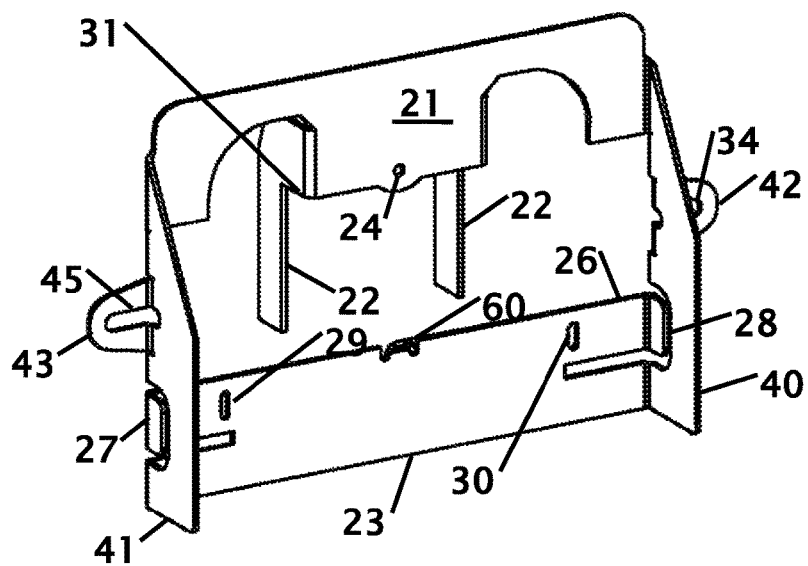
FIG. 10 shows the junction box bar bracket in a second preferred embodiment.

FIG. 10 shows the junction box bar bracket in a second preferred embodiment. This embodiment the top portion of the bracket is not present. The remainder of the clamping and securing mechanism and features remain unchanged.

Thus, specific embodiments of a junction box bar bracket have been disclosed. It should be apparent, however, to those skilled in the art that many more modifications besides those described are possible without departing from the inventive concepts herein. The inventive subject matter, therefore, is not to be restricted except in the spirit of the appended claims.

The invention claimed is:

1. A junction box bar bracket comprising:
a back plate configured to contact with a back side of an electrical box;
said back plate having at least one fastening hole configured for mounting said electrical box to said back plate;
said back plate further includes a pair of rear ribs that extend from shelfs that extend behind said back plate;
at least two side supports on sides of said back plate;
a pair of ears formed from said back plate and said two side supports;
each of said pair of ears include a void in a connection from said ears to said back plate wherein each of said pair of ears has a first side that is secured to said back plate around said void, a second side, a top side and a bottom side that is unsecured to said back plate and said two side supports;
each of said pair of ears is configured to independently bend and deform through said void under a back bar whereby a rectangular channel is created between said back plate, said rear ribs, said shelfs and said ears, and said rectangular channel is configured to allow said back bar to slide within said rectangular channel.

2. The junction box bar bracket according to claim 1 wherein said void is configured to accept a tip of a blade screw driver.

3. The junction box bar bracket according to claim 1 wherein said back plate is made of metal.

4. The junction box bar bracket according to claim 1 wherein said back plate is formed from sheet metal.

5. The junction box bar bracket according to claim 1 further includes a mounting bar.

6. The junction box bar bracket according to claim 5 wherein said mounting bar is adjustable for length.

7. The junction box bar bracket according to claim 5 wherein said mounting bar has flanges at both ends of said mounting bar.

8. The junction box bar bracket according to claim 7 wherein said flanges are offset from said mounting bar.

9. The junction box bar bracket according to claim 8 wherein said offset approximates a depth of said electrical box.

10. The junction box bar bracket according to claim 5 wherein said electrical mounting bracket is temporally securable onto said mounting bar.

11. The junction box bar bracket according to claim 10 wherein said back plate further includes at least one fastening ear.

12. The junction box bar bracket according to claim 11 wherein said at least one fastening ear includes two fastening ears on opposing sides of said back plate and each of said two fastening ears includes a slot.

13. The junction box bar bracket according to claim 12 wherein said slot is configured to accept a fastener to secure said junction box bar bracket to said back bar.

14. The junction box bar bracket according to claim 5 wherein said mounting bar is formed as to telescoping members.

15. The junction box bar bracket according to claim 5 wherein said mounting bar is electrically conductive to said electrical box through said back plate.

16. The junction box bar bracket according to claim 1 wherein said electrical box mounts to said back plate and is prevented from rotation with a single removable fastener.

17. The junction box bar bracket according to claim 1 wherein said ears further include ear tabs that are bent from said ears.

18. The junction box bar bracket according to claim 1 wherein back plate further includes a center notch.

19. The junction box bar bracket according to claim 1 wherein back plate further includes a top support with a plurality of holes that support conduit tubes.

* * * * *